United States Patent [19]

Hoffman, Jr. et al.

[11] Patent Number: 5,197,009
[45] Date of Patent: Mar. 23, 1993

[54] APPARATUS FOR AND METHOD OF CREATING DELIVERY ROUTE MAPS

[75] Inventors: Donald J. Hoffman, Jr., Melville; Robert D. Covington, St. Louis, both of Mo.

[73] Assignee: Mid America Technologies, Inc., St. Louis, Mo.

[21] Appl. No.: 898,177

[22] Filed: Jun. 12, 1992

Related U.S. Application Data

[63] Continuation of Ser. No. 715,303, Jun. 5, 1991, which is a continuation of Ser. No. 469,205, Jan. 24, 1990, abandoned.

[51] Int. Cl.$^5$ .............................................. G06F 15/20
[52] U.S. Cl. .................................... 364/443; 364/444; 340/990; 340/995
[58] Field of Search ....................... 364/443, 444, 449; 73/178 R; 340/988, 990, 995

[56] References Cited

U.S. PATENT DOCUMENTS

| | | | |
|---|---|---|---|
| 4,437,085 | 3/1984 | Salant | 364/444 |
| 4,546,439 | 10/1985 | Gene Esparza | 364/444 |
| 4,570,227 | 2/1986 | Tachi et al. | 340/995 |
| 4,951,211 | 8/1990 | De Villeroche | 340/995 |
| 4,954,959 | 9/1990 | Moroto et al. | 364/444 |

Primary Examiner—Gary Chin
Attorney, Agent, or Firm—Polster, Lieder, Woodruff & Lucchesi

[57] ABSTRACT

Apparatus for employing a computer program through a console having a touch screen operated CRT and related memory to produce a route map with customer address, delivery route instructions and directions on an area map which relates the location of the store from which a customer's order is made up for delivery to that customer. The make up of the apparatus includes an audio system for voice input and output to the motherhood of the CPU, and a modem which allows the computer to communicate to the outside world for purposes of updating the software and map data from a remote data base source.

1 Claim, 4 Drawing Sheets

APPARATUS FOR AND METHOD OF CREATING DELIVERY ROUTE MAPS

This is a continuation of copending application Ser. No. 07/715,303 filed on Jun. 5, 1991 which is a continuation of Ser. No. 07/469,205 filed on Jan. 24, 1990 now abandoned.

BACKGROUND OF THE INVENTION

1. Field of the Invention

The present invention is directed to apparatus for and method of producing instruction maps for effecting delivery of customer orders from a store or place where customer's orders are received.

2. Description of the Prior Art

In the past delivery of goods to customers, especially foods such as pizza, from a store or location where pizza is prepared has followed the plan of employing delivery personnel who are familiar with the territory served by a store or similar location. Such a person is counted upon to deliver a customer's order as rapidly as possible and in an acceptable condition. There are many problems in such a delivery system, such as late deliveries, need to train delivery people for service areas, allowing the delivery people to seek addresses, and the inability to give accurate instructions on preferred delivery routes between the store and the address of one or more customers living in a common area or adjoining streets. The past method has caused the store to choose a geographical place that has the potential to serve customers who are counted upon to place repeat orders by telephone for delivery on a rapid time schedule. Therefore, the geography of chosen areas is an important consideration to the success of the business of stores, as well as where stores may be located to serve customers rapidly.

When considering store location due consideration must be given to area maps where customers and potential customers are located. It is known that U.S. Pat. No. 4,873,513 has disclosed an automated map display system for electronically storing, accessing, and displaying video images generated from physical maps having field of view data representing a geographic coverage in longitude and latitude as a displayed image which is derived after the map image is generated. The object of the system of the aforesaid patent is to be able to store map images on an optical disk and selectively access and display portions of maps having various fields of view, and different map scales.

SUMMARY OF THE INVENTION

An important object of the invention is to provide a store with apparatus that will enable, upon receiving a customer's order, prompt delivery by producing an area map in such detail that the address of any customer can be identified and the most efficient route can be identified between the store and a given customer, with the result that on-time deliveries can be made through the route best suited to save time with the use of delivery personnel who may not be sufficiently familiar with the location of streets and addresses in the customer area being served.

It is also an important object to provide each store with an efficient and current customer area map having address details that show the most efficient route to be followed by the person making a delivery, and to produce the area maps quickly and in a simple easily understood paper print-out.

A further object is to provide computer programs for producing map print-outs having the customer's address, street route designation, detail area of the geographical location of the store which serves the customer, and details of street names and turns to be made by the delivery person.

The objects of the invention are practiced through the arrangement of apparatus which accesses the software computer program through a touch screen to feed a printer with the customer's street address, and activate the printer to produce a paper map having the customer's street address and route from the store to the address of that customer designated thereon.

BRIEF DESCRIPTION OF THE DRAWINGS

The invention comprises apparatus arranged in a unique way to practice the method, and reference is directed to the following, wherein:

FIG. 2 is an enlarged view of the video screen displayed through the touch screen when the apparatus is turned on;

DETAIL DESCRIPTION

Figure 1:
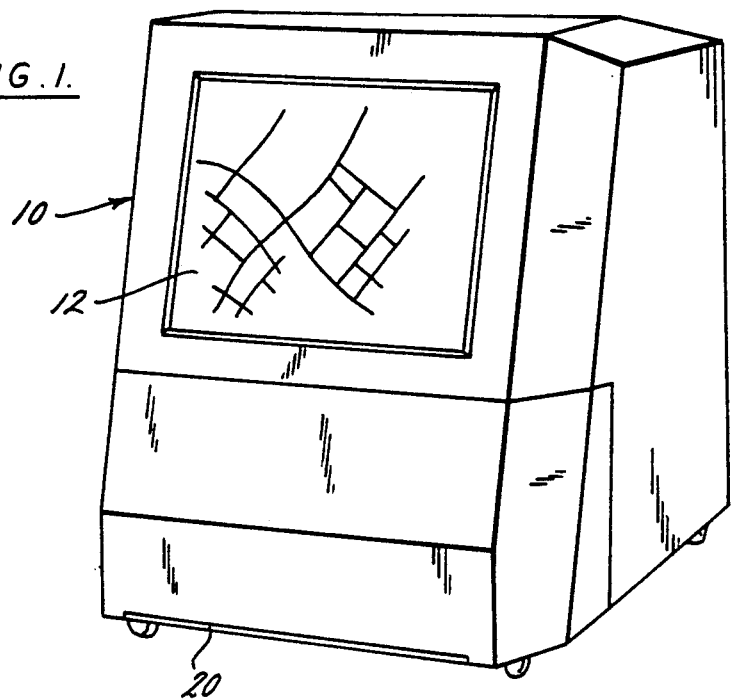
FIG. 1 is a perspective view looking at the video screen of the console formed with a map delivery slot below the screen.

The apparatus of this invention is embodied in a console 10 having a cathod ray tube 11 (CRT) presented behind a touch screen 12. When the console is turned on the program presented on the CRT is a keyboard divided into a numeric block 13, an alphabetic block 14, a street name or address window display block 15, a selected street address window display block 16, and peripheral controls such as control 17 to actuate the street address display block to scroll up further street names, a control 18 to cancel the information being selected through the touch screen, and a control 19 to actuate a map print out which is delivered from the console 10 at the delivery slot 20. The program embodies the keyboard so that the touch screen 12 is able to enter address information into the central processing unit 21 (CPU) to access the address and map information stored in a hard disk 23.

Figure 4:
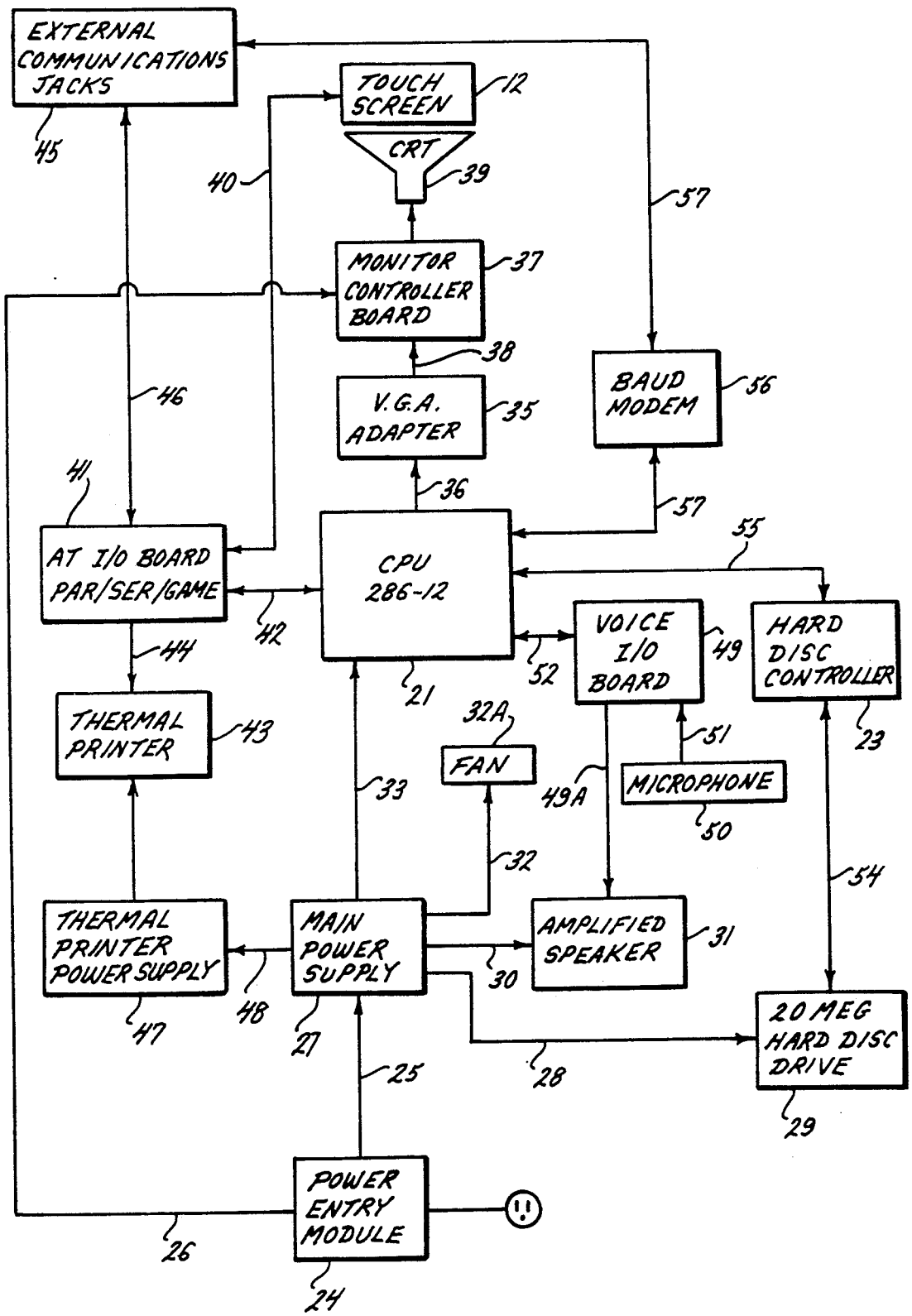
FIG. 4 is a block diagram of the components of apparatus for producing delivery route maps.

The block diagram of FIG. 4 details the several elements and components in the system. The 120 volt module 24 is a fused, filtered, and switched power supply having an external pack for plugging into a conventional 120 VAC power source. Module 24 provides an outlet lead 25 and an outlet lead 26. Lead 25 supplies the main power supply module 27 with powr take-off having varying regulated voltages. A power take-off lead 28 supplies 5 to 12 volt power to a hard disk drive module 29, a second power take-off lead 30 of twelve volts powers the speaker amplifyer module 31, a third power take-off lead 32 of twelve volts power the ventilation fan module 32A, and a fourth power take-off lead 33 of reduced voltage operates the central processor unit 21 which is an IBM 286-12 AT Compatible very large scale integration (VSLI) module.

The output of the CPU 21 is connected to a video graphic array (VGA) module 35 by lead 36, and that module 35 is connected to a motor controller board in module 37 by lead 38. In addition, the latter board 37 is connected by lead 26 to the module 24 for energizing the cathod ray tube 11. In order to energize the various program block seen in FIG. 2, the touch screen 12 is connected by game lead 40 to an IBM module 41 which is an AT I/O board with parallel /series/ game ports that cause the CPU 21 to execute the responses that are touched on the touch screen 12. The touch screen 12 is a product of Edmark Corporation, "TOUCHWINDOW" division. It allows the user to press on the screen and obtain a response from the CPU where the press was made. The screen 12 replaces a keyboard on a conventional computer. In this system, the CRT is a Magnivox unit, the monitor controller board (Magnivox) and the video graphic array (VGA) adapter (PC House) allows the computer 21 to output information to the user on a black and white screen. The screen of the CRT shows the touch response from the screen 12. The VGA adapter 35 connects by lead 36 directly to the main CPU motherboard. The AT I/O board 41 provides the functions of connecting the CPU motherboard by lead 42 to the printer 43 by parallel lead 44, and the external jack 45 by serial lead 46.

The apparatus includes a modem system for interconnecting the individual apparatus of FIG. 4 with a central data base. Thus, the modem 56, connected by lead 57 from the CPU 21, receives signals from the external jack 45 by lead 57A so that update information can be incorporated.

Figure 3:
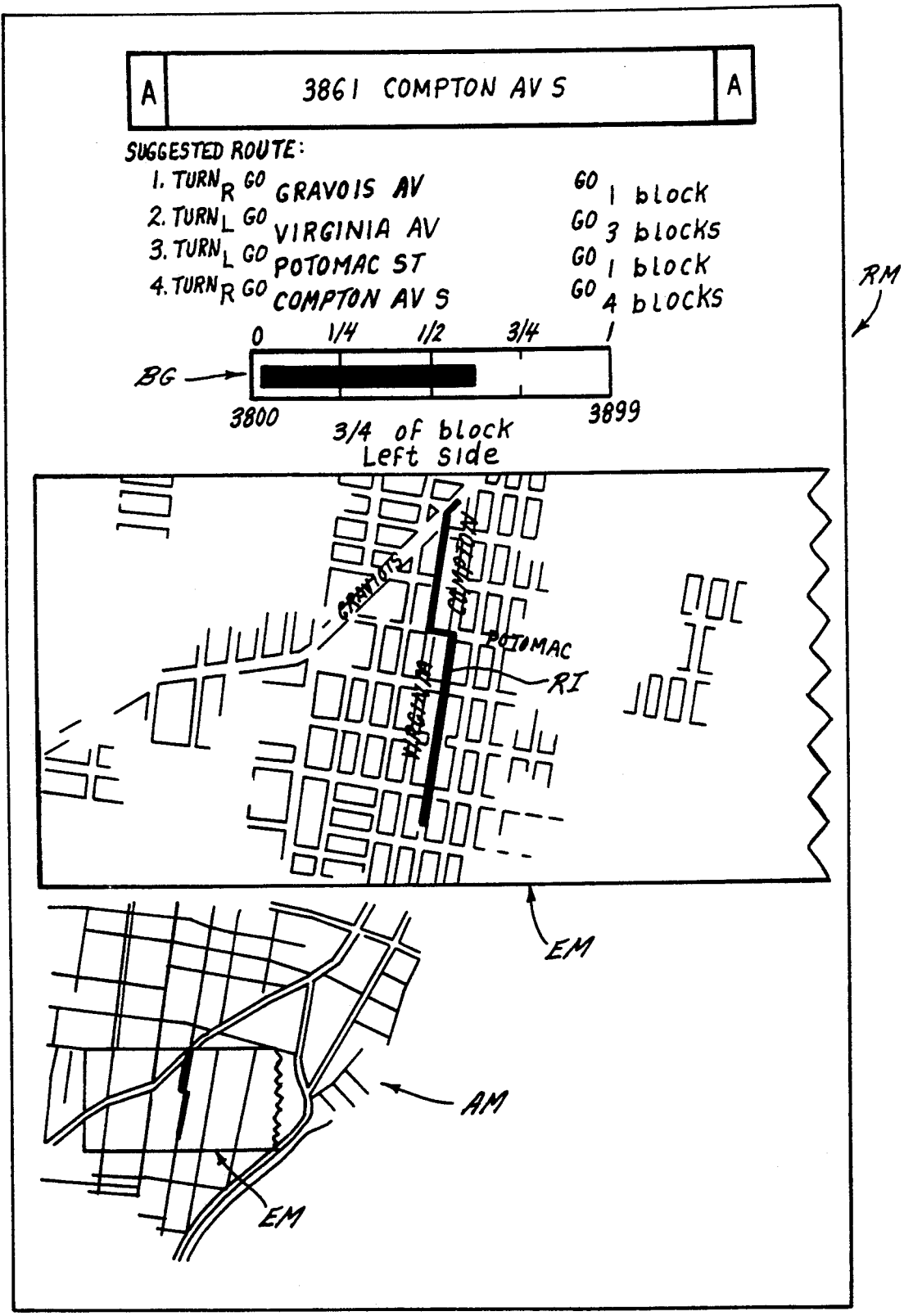
FIG. 3 is an example of a map having the delivery route indicated on the area map for the store and including customer area address.
Figure 5:
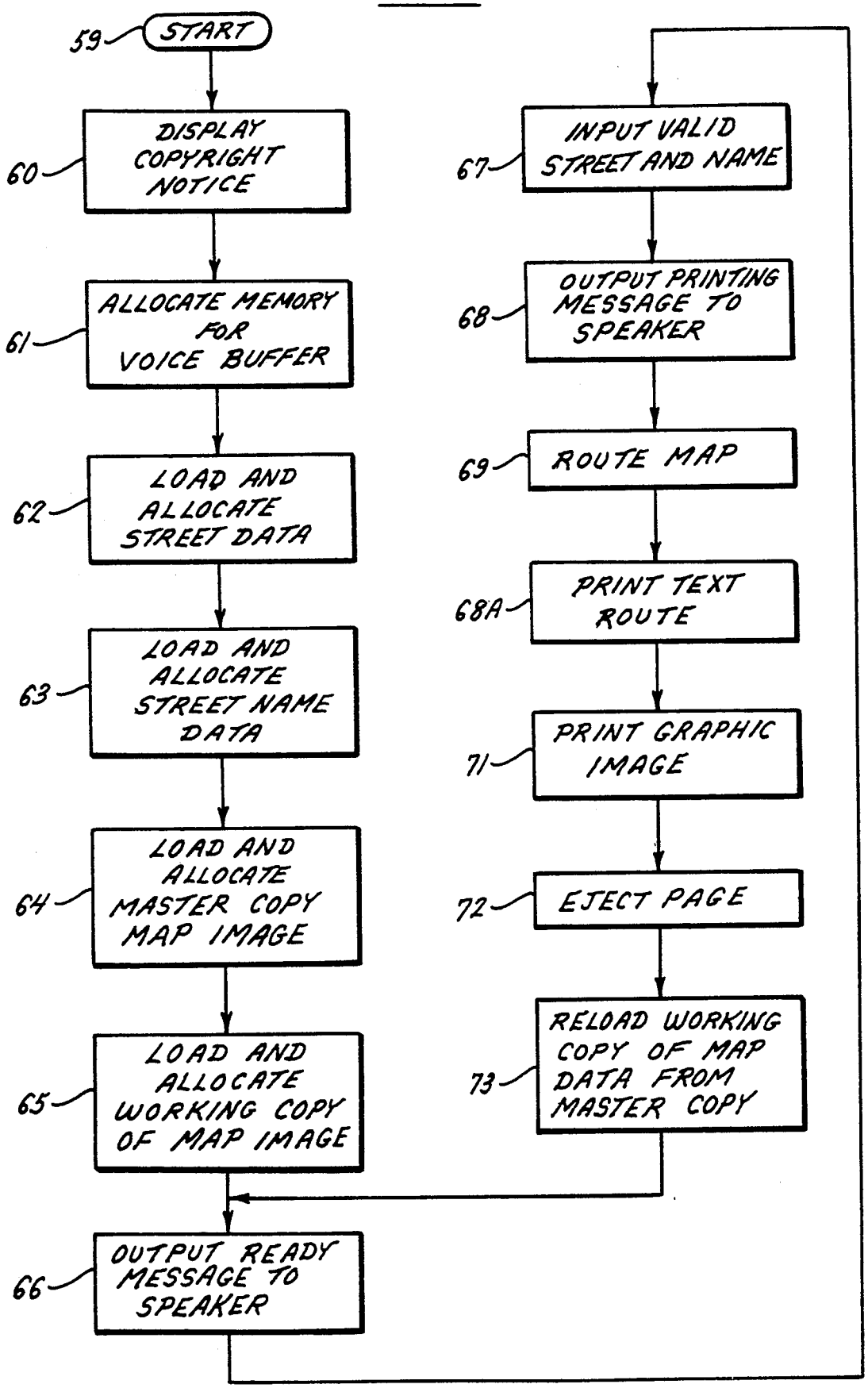
FIG. 5 is a flow diagram outlining the operation of the invention.

The method of the present invention is disclosed in the flow diagram of FIG. 5. At the start 59, the video screen 60 will identify the subject matter of the system. Then in sequence, the system will allocate the memory for a voice buffer 61, then load and allocate the street data 62 (such as a number), then load and allocate the street name data 63 (such as the name of the street), then load and allocate the master copy of the map image 64. In connection with the master copy of the map, the master map copy relates to the area map for a given store identified in the computer program and is different for each store, but every map produced at a given store is the same. However, the enlargement part of the map changes depending on the address location in the master area map. In FIG. 3, the area map is seen at AM, while the enlarged map EM is only a local portion of the area map. At this stage, the system announces a output ready message to the speaker 66 followed by validating the street name 67. If the street address is valid, the system will deliver a vocal message 68 that the information is being printed at 68A on a route map 69, and the text of the route map 69 is being added and that is followed by printing the graphics 71 so that the finished map is delivered at 72. At this time, the system operates at 73 to reload a working copy of a map from the master copy.

The thermal printer 43 (Eltron) is used to output a map showing delivery routing information from the map storage, and prints it onto thermal paper. The printer produces the graphics depicted in FIG. 3, and has its own thermal paper drive module 47 with a 120 V power supply from lead 48.

The system seen in the block diagram of FIG. 4 includes a module 49 which is a voice I/O board which converts the digital voice information from the CPU 21 to analog signals and visa versa (bidirectional analog to digital conversion) with an I/O board which connects to an external microphone 50 by lead 51. For voice output, the board connects by lead 49A to the amplifier speaker 31 which is powered through lead 30. The voice I/O board in module 49 connects by lead 52 directly to the CPU motherboard in the CPU 21.

The program for the system is in the hard disk controller 23 having hard disk drive module 29. Permanent storage for the map source, its data for routing, and map program are manipulated by the hard disc controller 23, and the hard drive 29 also provides additional storage for the map program while it is manipulating the map data. The hard disc controller 23 connects directly to the hard drive 29 by lead 54 and connects directly to the CPU motherboard by lead 55.

In view of the foregoing disclosure, it is apparent that the apparatus of the invention is directed to making it relatively easy for a delivery person to pick up an order at a store and deliver it to the customer's address with a minimum of effort to locate the proper address. The apparatus includes means for electronically storing the map of the area of a store where a store is located and means for selecting from that stored map when required an enlarged portion EM of the area map AM which includes the location of the store and the location of the customer's address. In producing the map a route is indicated RI from the store to the customer's address and on printing of the map there is produced for the assistance of the delivery person a locator map which includes the customer's address with instructions to make the necessary travel direction from the location of the store to the customer's address by designating streets and right and left turns which will get the delivery person to the eventual address. The printout will also include a bar graph BG of the block in which the address is located so that by following the length of the bar graph the delivery person will travel whatever distance in a given block is necessary to locate the specific address. The printout of the map will give the delivery person an adequate visual guidance to effect the delivery.

The apparatus includes a software or computer program for storing portions of geographic maps corresponding to the customer area served by the store so that delivery instructions can be shown visually on a map as to what streets and turns are necessary in order to make a delivery. The console 10 which houses the computer program is provided with a touch screen 12 having the necessary numeric, alphabetic, and address street names block 13, 14 and 15 respectively arranged in a keyboard layout so that a customer's address can be keyed in merely by touching the various block areas 13-14 on the monitor screen to produce an address in a window 19 that will provide a visual way of checking the correct address, after which an instruction is given to touch the screen in a proper place for energizing the printer mechanism to deliver a map according to what is disclosed in FIG. 3 of the drawings.

The subject invention is adaptable for use in a subscriber related network so that a number of stores located in different geographic areas can be connected by a modem hook up to a central data base so that it will be possible for a given subscriber to receive updated information as to customer addresses and as to entering other parts of the system into the subscriber's console without, in most cases, being required to send a service person from the location of the data base to the subscriber's store.

Figure 2:
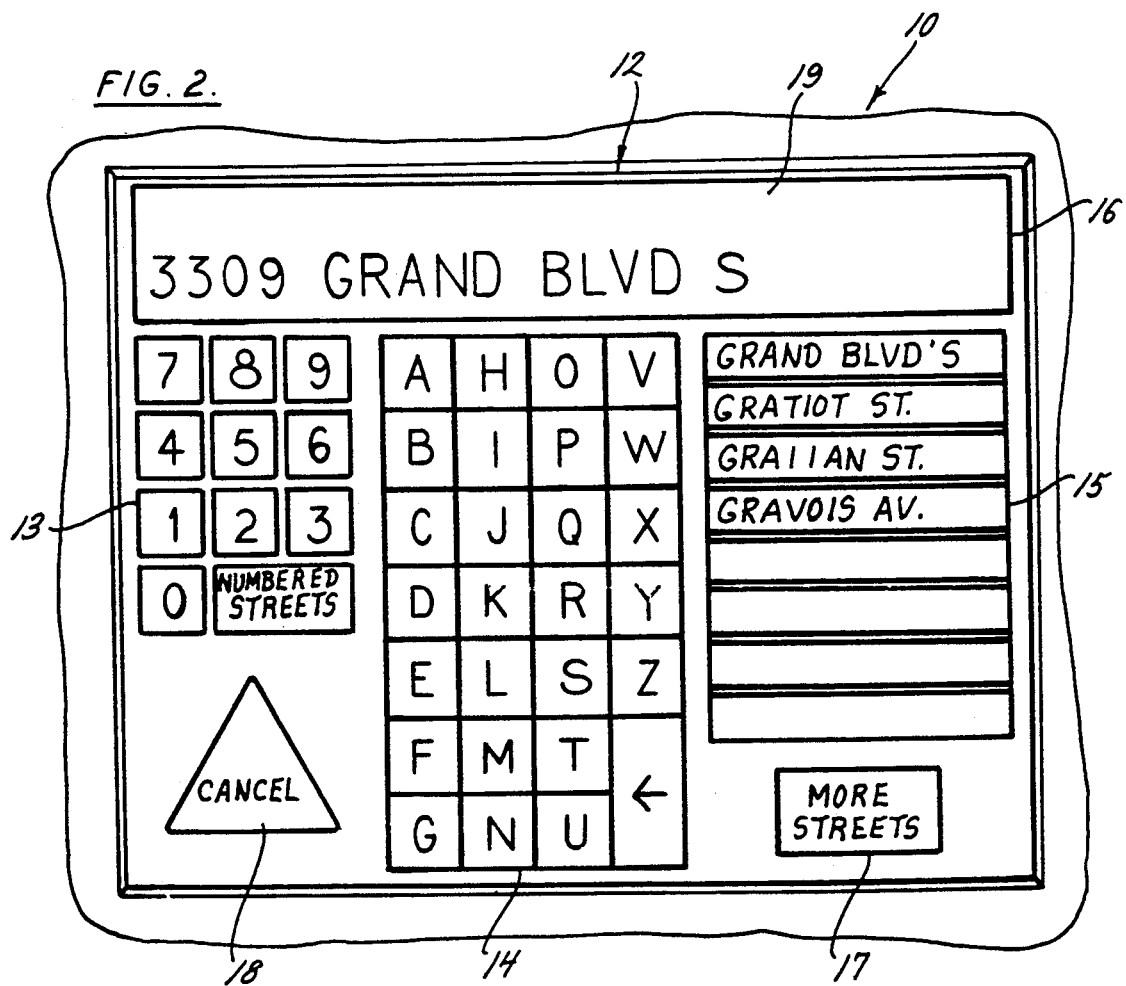

With reference to the flow diagram in FIG. 5 and making the necessary visual comparison with FIGS. 2 and 3, it is understood that the subscriber's console of FIG. 1 can be turned on so as to bring the computer program and memory up to operating condition preparatory to entering a customer's address by operating the numeric pad 13 and the alphabetic pad 14 after visually checking the street name pad 15 for the correct spelling which can then be entered by touching the various letters on the alphabetic pad 14. It then follows that the operator of the console when satisfied with the address information can then touch the screen to effect production of a map of the character shown in FIG. 3. The flow diagram includes a voice system for indicating orally when the computer program has produced the address information and the related map, followed by the voice system to indicate when the screen is to be touched to produce the map. Accordingly, a route map RM with the address printout text is produced and is then ready to be given to a delivery person. The computer program after issuing a route map is then returned to a ready condition to be again operated upon the touch screen entering a new address in the manner set forth above.

It is understood that the foregoing description has set forth a presently preferred embodiment of the invention in its aspects as to apparatus, its method of operation and its association in a subscriber related network, and the scope of the invention includes a method heretofore expressed for mapping at least one route to a given address from the location of a map printer which includes feeding in the address information, getting back a printed map with a route marked on it to use in travelling to the address, and

What is claimed is:

1. Apparatus for a store operator to be able to produce a route map printout for use by a delivery person hired by the store operator to make a delivery to a customer remote from the store but residing in the area serviced by the store, the delivery being in response to an order called in by said remote customer to the store offering delivery service to said customer residing at an address in the service area of said store, said apparatus comprising:
   a) central processing unit means for electronically storing in a memory a store service area map which includes address locations of all potential customers residing within the service area related to said store;
   b) a console having a cathod ray tube presenting a visible screen on which are presented divisions denoting numeric, alphabetic, street name address, and a division for street and numeric address display, and said console including touch screen means on said cathod ray tube visible screen in position readily operable by said store operator, in response to a remote customer calling in to request delivery service on an order, for selecting by touching said visible screen address information corresponding to a portion of the service area map which includes the address location of said given customer given to the store operator by the given customer calling in an order;
   c) video graphic array means connected to said central processing unit and said cathod ray tube for energizing from said visible screen the street and number address operated by said store operator for depicting on the said selected portion of the said service area map the actual address marking and a complete delivery route to follow from said store to the said given customer's address location; and
   d) means for producing a printout of the said selected portion of the service area map and said marking thereon depicting the actual marking of the delivery route for visual guidance of the delivery person for making a delivery to said given remote customer's address location, said printout of said selected portion of the service area map being made available to said delivery person for guidance to complete delivery to said remote customer.

* * * * *